J. McCONNELL.
Meat-Broiler.
No. 200,622. Patented Feb. 26, 1878.
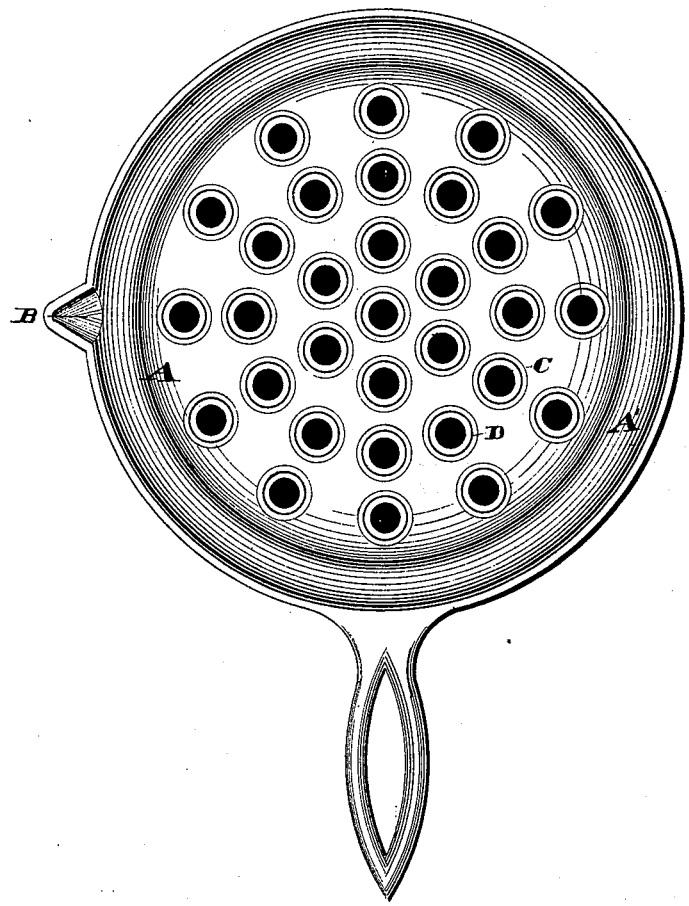
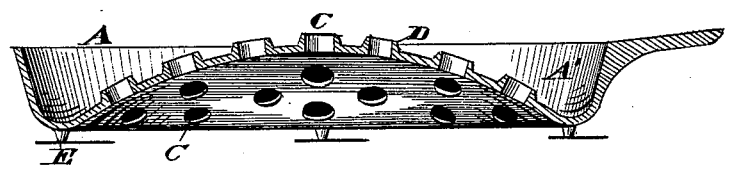
WITNESSES
Ed. J. Nothingham
A. W. Bright.
INVENTOR
John McConnell,
By Leggett & Leggett
ATTORNEYS

UNITED STATES PATENT OFFICE.

JOHN McCONNELL, OF CLEVELAND, OHIO.

IMPROVEMENT IN MEAT-BROILERS.

Specification forming part of Letters Patent No. 200,622, dated February 26, 1878; application filed July 23, 1877.

*To all whom it may concern:*

Be it known that I, JOHN MCCONNELL, of Cleveland, in the county of Cuyahoga and State of Ohio, have invented certain new and useful Improvements in Meat-Broilers; and I do hereby declare the following to be a full, clear, and exact description of the invention, such as will enable others skilled in the art to which it pertains to make and use it, reference being had to the accompanying drawings, which form part of this specification.

My invention relates to a new and useful improvement in meat-broilers.

In the drawings, Figure 1 is a plan view of a broiler embodying my invention. Fig. 2 is a sectional view of the same.

A is the body of the broiler, preferably provided with a depressed channel, A', for the collection and retention of the gravy extracted in broiling. B is a lip or spout for facilitating the emptying of the gravy from the receptacle A'. C are holes through which the heat or flame can have direct access to the under surface of the meat. D are abrupt ridges bounding each of the holes C. These ridges, being very abrupt, leave gravy-passages between their sides and the meat that is being broiled. Moreover, the holes being small and entirely bounded by the abrupt ridges, the gravy is prevented from running along the edges of the holes, and finally dripping into the fire, as is the case where the openings are large or long, or where the ridges are not made abrupt and high.

Of course, it is immaterial whether the holes are circular in shape or whether they are oblong, square, or of any polygonal figure, the essential feature being that the ridges shall be high and abrupt, and the openings sufficiently small that the gravy shall be prevented from running along the edges of the holes and dripping into the fire.

I prefer that the holes C shall be arranged in alternate or quincunx order, so that in use the meat will be so supported as not to settle down between the openings onto the surface of the broiler, but to leave these passages all open for the free escape of the extracted gravy.

E are lugs; or a rim projecting downward may be employed instead, the object being to prevent the broiler from slipping off the stove, or from sitting down so closely as to burn the meat at the edges while it is being broiled along the middle. If legs are employed, there should be three or more of them.

What I claim is—

A meat-broiler whose concavo-convex body is provided with a series of holes, the sides of each of which are at right angles to that portion of the broiler-body through which it passes, and each of which is provided on the upper surface of the broiler with an abrupt ridge extension or inclosing-rim, substantially as described.

In testimony whereof I have signed my name to this specification in the presence of two subscribing witnesses.

JOHN McCONNELL.

Witnesses:
FRANCIS TOUMEY,
W. E. DONNELLY.